United States Patent [19]

Singer et al.

[11] Patent Number: 4,891,203

[45] Date of Patent: Jan. 2, 1990

[54] FLAKE-LIKE CARBON BODIES FROM SEMICOKE

[75] Inventors: Sidney L. Singer, Berea; David T. Orient, Medina, both of Ohio

[73] Assignee: Union Carbide Corporation, Danbury, Conn.

[21] Appl. No.: 750,532

[22] Filed: Jun. 28, 1985

[51] Int. Cl.$^4$ .................. C01B 31/00; C01B 31/02; C01B 31/04; C09C 1/48

[52] U.S. Cl. .................................. 423/449; 423/445; 423/448; 423/450

[58] Field of Search ............... 423/448, 449, 450, 445

[56] References Cited

U.S. PATENT DOCUMENTS

| | | | |
|---|---|---|---|
| 3,035,308 | 5/1962 | Ragoss et al. | 423/448 |
| 3,504,065 | 3/1970 | Edstrom | 423/449 |
| 3,546,076 | 12/1970 | Muller et al. | 201/6 |
| 3,560,155 | 2/1971 | Olstowski et al. | 423/448 |
| 3,787,541 | 1/1974 | Grindstaff et al. | 264/29 |
| 3,943,213 | 3/1976 | Whittaker et al. | 264/29 |
| 3,956,436 | 5/1976 | Honda et al. | 423/448 |
| 4,005,183 | 1/1977 | Singer | 423/447 |
| 4,071,604 | 1/1978 | Schwemer | 423/445 |
| 4,213,956 | 7/1980 | Ubbelohde | 423/448 |

FOREIGN PATENT DOCUMENTS 1526809 10/1978 United Kingdom .

*Primary Examiner*—Gregory A. Heller
*Attorney, Agent, or Firm*—E. Lieberstein

[57] ABSTRACT

An anisotropic carbonaceous body is produced by plastically deforming a pitch-based semicoke at elevated temperature to align the internal structure. The semicoke may be carbonized and graphitized while retaining its anisotropic properties.

33 Claims, 1 Drawing Sheet

4,891,203

FLAKE-LIKE CARBON BODIES FROM SEMICOKE

FIELD OF THE INVENTION

This invention relates generally to anistropic semi-coke flakes which may be converted to carbon and graphite and a process for making such bodies from carbonaceous pitch.

BACKGROUND OF THE INVENTION

The production of carbon and graphite bodies having controlled properties has been the subject of much research. In recent years, bodies produced from pitch, and in particular, mesophase pitch, have shown remarkable properties in flexural resistivity, density and other areas.

U.S. Pat. No. 3,943,213 describes the mixing of from 1 to 50 weight percent chopped carbon fibers in a hot fluid mesophase system, the forming or casting of a shaped article from the mixture, and the subsequent graphitization of the shaped article. The composite product is described as having enhanced structural properties, although no directional properties are disclosed.

Other patents also disclose the production of shaped carbonaceous bodies made from pitch-based precursors. U.S. Pat. No. 3,546,076 describes a method of producing metallurgical coke briquettes comprising heating pitch-based raw coke particles having a volatile content of 10 to 20 weight percent to a temperature between 300 and 525° C., preferably between 325 and 470° C., applying sufficient pressure to cause the hot particles to adhere to each other. and form the briquettes, and then carbonizing the briquettes. Raw coke particles having a volatile content as low as 8 weight percent may be used if mixed with higher volatile content coal. The coke briquettes are not disclosed as having anistropic properties.

U.S. Pat. No. 4,071,604 describes the production of carbon bodies from carbonaceous pitch that has been advanced to a plastic amorphous precursor to coke having 3 to 11 weight percent volatile content. The carbon bodies made from the coke precursor are isotropic in nature, having been comminuted in the precursor stage, pressure shaped, and carbonized.

The following patents relate to the production of anisotropic carbon bodies from pitch, specifically mesophase pitch:

U.S. Pat. No. 3,787,541 describes a process for producing graphite bodies by extruding mesophase pitch having at least 22% volatile content and subsequently carbonizing and graphitizing the extruded pitch. The patent describes the spinning of thin fibers under 0.3 mm in thickness and the extrusion of larger bodies of 2.5 inches (63.5 mm) thickness. The coefficient of thermal expansion (CTE) of molded bodies is given as from 1.5 to $8 \times 10^{-6}$ °C.$^{-1}$ in the molding direction and from 0.5 to $8 \times 10^{-6}$ °C.$^{-1}$ in the transverse direction.

Improvements in graphitizable carbon fibers are disclosed in U.S. Pat. No. 4,005,183. The patent discloses that anisotropic carbon and graphite fibers may be produced by spinning and heating fibers made from greater than 85 weight percent mesophase. However, the high viscosity of 85 weight percent mesophase makes such spinning very difficult. That patent further describes the production of highly anisotropic carbon and graphite fibers from pitch having less than 85 weight percent mesophase by spinning the pitch into fibers, thermosetting the fibers by heating in oxygen, and then carbonizing and graphitizing the givers. The oxidative thermosetting step makes possible the preservation of the crystal orientation of fibers produced from pitch containing less than 85 weight percent mesophase.

British Pat. No. 1,526,809 describes the forming of an extruded graphite article by inclusion of oriented anisotropic carbon shapes such as rods, bars, filaments or sheets produced from pitch having from 40 to 90 weight percent mesophase. The as-formed mesophase pitch shapes are oxidatively thermoset before carbonizing as in the previously discussed patent. Graphite articles produced by this method were found to have exceptionally low coefficients of thermal expansion (CTE) in the longitudinal direction.

In the prior art practice exemplified by U.S. Pat. No. 4,005,183 and British Pat. No. 1,526,809, the remaining volatile components of the mesophase pitch are largely expelled after the pitch fibers have been rendered infusible by oxidative thermosetting. Without this additional step of oxidative thermosetting, the as-formed pitch fibers cannot be converted to carbon and graphite without melting. The oxidative thermosetting that is necessary in this practice may also inhibit the carbon from developing fully the three dimensional order of polycrystalline graphite. In addition, the core regions of thicker shapes cannot retain their orientation during carbonization because oxygen generally cannot diffuse beyond a relatively thin surface layer.

Based on the state of the art, there is a need for highly anisotropic, controlled property carbon and graphite bodies in shapes other then thin fibers and a method of producing same in which oxidative thermosetting is not required to prevent melting and resultant loss of orientation during carbonization and graphitization.

OBJECT OF THE INVENTION

The object of this invention is high strength, anisotropic semicoke bodies and a method for producing such bodies. It is also the object of the present invention to provide a method for producing anisotropic, high strength, low coefficient of thermal expansion carbon bodies in which oxidative thermosetting is not required. It is further the object of the present invention to produce such carbon bodies in shapes other than thin fibers. It is also the object of this invention to produce high strength, anisotropic, flake-like carbon bodies which may be incorporated into other carbon or graphite bodies. It is also the object of this invention to produce carbon and graphite bodies having very low coefficient of thermal expansion and high strength by incorporating oriented, anisotropic flake-like bodies.

These and other objects have been achieved by the present invention as hereinafter described.

SUMMARY OF THE INVENTION

In one aspect, this invention relates to a flake-like semicoke body having highly anisotropic properties and crystallite layers oriented essentially parallel to the plane of the flake throughout the body.

In another aspect, this invention relates to a process for producing an anisotropic carbonaceous body comprising providing a carbonaceous pitch-based semicoke having a TMA deformation temperature of at least 400° C. and thereafter plastically deforming the semicoke at temperature above the TMA deformation temperature to align the internal semicoke structure and form an anisotropic flake-like semicoke body.

DETAILED DESCRIPTION OF THE INVENTION

Figure 1:
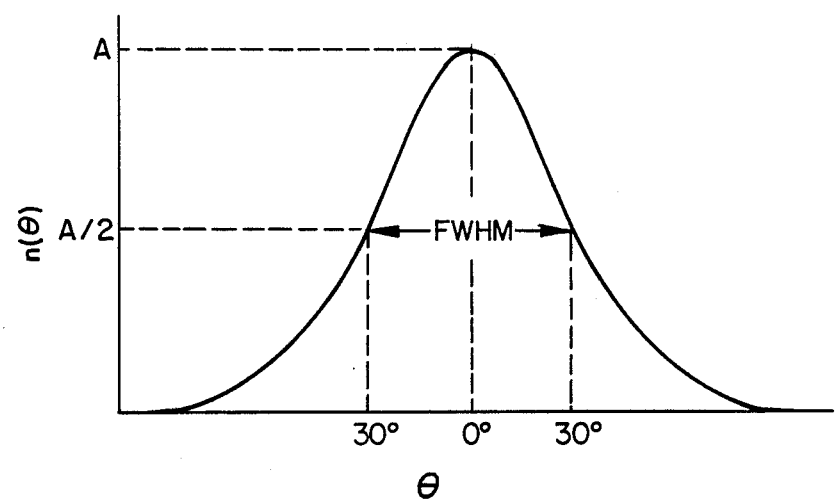
FIG. 1 shows the plot of a distribution of layer normals within an anisotropic semicoke body having a full-width-at-half-maximum of 60° C.

As various forms of carbonaceous pitch derived from petroleum, coal or other organic compounds are heated, the hydrocarbon components undergo various polymerization reactions and evolution of volatile gases until only carbon remains. These precursor pitches are used to produce carbon and graphite products as well as various intermediate forms which contain some fraction of hydrocarbons. Graphitizable pitches pass through a particular stage known as mesophase as they are thermally advanced. This mesophase stage is characterized by the presence of an isotropic liquid containing insoluble spheres which consist of layers of highly oriented hydrocarbon molecules. Continued heating of mesophase pitch causes further polymerization and evolution of volatiles until an infusible coke is formed having less than about 6 weight percent volatile content. Unlike prior processes which attempt to retain the anisotropy present in mesophase pitch by forming it in a relatively fluid state, the present invention does not subject fluid mesophase to any forming, but, instead, advances it to a highly viscous mesophase which has been termed "semicoke".

"Semicoke", as used herein, refers to a highly viscous mesophase produced from the aforementioned pitches that has not yet advanced to infusible coke. Although the melting point of semicoke cannot be measured by any conventional softening point apparatuses, the deformation temperature, as measured by thermal mechanical analysis (TMA) in an inert atmosphere, is at least about 400° C. TMA is a well-known analytical procedure and is described in detail in *Thermal Characterization of Polymeric Materials*, W. W. Wendland and P. K. Gallagher, Academic Press, Inc. New York 1981. Semicoke is also plastically deformable, unlike infusible coke which tends to fracture and crumble when deformed. Semicoke in the plastically deformable state and the desired TMA deformation temperature range will contain volatile constituents greater than the approximately 6 weight percent of premium raw coke, preferably at least 8 weight percent. The maximum volatile content will be less than 10 weight percent (volatile content determined by ASTM standard D 3175-77, "Volatile Matter in the Analysis Sample of Coal and Coke"). Quinoline insoluble content for these semicokes, determined by Soxhlet extraction in quinoline at 75° C., is greater than approximately 99 weight percent.

It has been unexpectedly discovered that the internal structure of semicoke can be oriented by plastic deformation at elevated temperature above the TMA deformation temperature to form a body having a shape other than that of a thin fiber which can then be further processed without disrupting the internal orientation to an anisotropic, infusible carbonaceous body without oxidative or other chemically induced thermosetting. Oxidative thermosetting is the heating in the presence of oxygen which provides intermolecular cross linking to retain the configuration and internal orientation of carbon layers, but which may prevent fibers from developing fully the three dimensional order of polycrystalline graphite in later heat treatment.

The thermal advancement of pitch to fluid mesophase to semicoke is important in the practice of the present invention. As a pitch is heated between 400° and 500° C. to form mesophase pitch, it gradually increases in average molecular weight as the isotropic pitch converts to mesophase. The pitch may be thermally advanced to mesophase by any of the various processes known in the art. Mixing while heating, for example, in a stirred reactor, has been considered standard for this type of process. However, for the purpose of this invention, mesophase may be produced without mixing, for example, in conventional delayed cokers, as well as in continuous reactors utilizing settling, with and without screw extruders.

After the pitch is fully converted to mesophase its average molecular weight continues to increase with heat treatment. Since this polymerization process involves dehydrogenative condensation reactions, hydrogen, methane and other non-condensable hydrocarbonaceous gases are evolved. Eventually the remaining material advances to the semicoke stage, reaching a viscosity of greater than approximately 200 poise. At this stage gases cannot escape without producing foam. Foaming can cause the original volume of the pitch to expand by a factor of several times. Highly foamed semicoke is less desirable for certain process steps within the scope of this invention because of its low density and the high degree of compression required in preparing a dense, highly oriented product.

According to this invention, it has been found that particular combinations of starting mesophase pitch and thermal advancing techniques can minimize this disruptive foaming action. This includes the discovery that highly uniform mesophase pitches having a relatively narrow molecular weight distribution are undesirable. Such pitches increase in viscosity uniformly during heating when volatiles are being driven off, thereby enhancing the formation of foam. Mesophase pitches having broader ranges of molecular weights increase in viscosity nonuniformly and allow volatiles to escape more readily through the low viscosity, low molecular weight regions. This reduces the formation of foam.

Foaming is also minimized by excluding oxygen and retaining volatile pitch constituents and reaction products over the pitch in an enclosed system either with or without a flowing inert gas. For example, covering the vessel opening with metal, e.g., aluminum foil, is a simple way of achieving this to a limited extent, even though the enclosure is not gas tight. Enclosure confines the volatiles being expelled from the pitch during heating. This phenomenon suggests that the volatiles causing the foaming may not be totally non-condensable, and also that the desolubilization and expulsion of volatiles may be dependent upon the partial pressure of these species over the pitch. The example given above of covering the vessel opening with aluminum foil has been found to suppress the total amount of volume expansion of foaming by a factor of approximately two. Greater retention of volatile pitch constituents and reaction products may be achieved by making the enclosure gas tight, thereby suppressing foaming even further.

Suitable semicoke may be prepared by heating, for instance, a 70–80 percent mesophase pitch (softening point in the range of 320° to 330° C.) at 450° C. for six hours in a covered vessel. and in a non-reactive atmosphere. Semicoke having low foaming characteristics has also been found in delayed coker raw cokes which have higher than desired volatile content (and which generally have to be discarded by the producer). The desired semicoke will have some large holes but no fine porosity, with the diameters of the holes generally ranging up to approximately 1 mm. In order to avoid the need for excessive compression in the practice of this invention to form a dense, highly oriented product, the minimum semicoke bulk density is preferably about 0.3 Mg/m$^3$. As used herein, "bulk density" refers to geometrical bulk density, i.e., the mass of a body having a well defined geometrical shape divided by the volume calculated from its dimensional measurements.

The semicoke produced in practice of one aspect of the present invention and also used to produce anisotropic carbon in accordance with another aspect must have a TMA deformation temperature of at least 400° C., preferably from 400° to 500° C., more preferably 400° to 470° C., and, further, must be plastically deformable at and above the TMA deformation temperature. Semicoke having suitable plastic deformation characteristics, TMA deformation temperature, and density has been produced by heating mesophase pitch and has also been found in the aforementioned delayed coker raw cokes. The TMA deformation temperature may be varied within the preferred range by adjusting the length of time and temperature for heating. While the above-described mesophase pitch was heated at 450° C. for 6 hours to produce the desired semicoke, a person having ordinary skill in the art would be able to determine the proper time and temperature for heat treating other starting pitches to produce the desired TMA deformation temperature semicoke. The volatile content of the properly produced semicoke will be in the range of approximately 8 to 10 weight percent.

The apparatus used to determine TMA deformation temperatures in the experiments described herein is the Perkin Elmer Model TMS 1 Thermomechanical Analyzer, equipped with a quartz penetration probe (1 mm diameter) and a high temperature furnace capable of reaching 700° C.

The procedure employed to measure the TMA deformation temperature is as follows. The semicoke is first ground to a fine powder. A cylindrical pellet of approximate dimensions, 8 mm diameter and 3 mm height, is formed in a pellet press at room temperature at a pressure of approximately 400 MPa. The pellet is placed in the bottom of the quartz sample tube which is positioned at the center of the furnace. The quartz probe with a load of 12 grams, connected to a linear variable differential transformer (LVDT), is placed on the top of the pellet. A thermocouple is placed next to the pellet to measure its temperature. A helium flow of approximately 275 cc/min. is introduced into the sample chamber. This is enough to inhibit oxidation without cooling the sample. With the probe in contact with the sample, the temperature of the sample is increased at a rate of 40° C./min. up to 200° C., and then at a slower rate of 10° C./min. above 200° C.

A recorder charts the LVDT voltage relative to the thermocouple voltage, i.e., the displacement of the probe versus temperature. The increase in elevation of the probe with increasing temperature is due to the thermal expansion of the semicoke pellet. As the pellet softens, the probe begins to penetrate its surface. The initiation of probe penetration is indicated at the point of deviation from a linear rate of elevation. The probe eventually begins to drop rather than rise with increasing temperature as it penetrates the pellet faster than the pellet tends to raise it. The procedure is terminated when the probe has dropped below its maximum upward displacement. The TMA deformation temperature is defined as the temperature at which the maximum upward probe displacement occurs.

The next step in the process of this invention is the plastic deformation of the semicoke by hot pressing to reduce its thickness and produce a flake-like or sheet-like body. As used herein, "plastic deformation" means deformation beyond elastic and substantially in the absence of fracture. Also as used herein, "flake-like" means having one dimension that is small in comparison to the others. The flake-like body may be flat or curved. The thickness to width ratio is generally less than about 1:15.

The reduction of the thickness of the semicoke by plastic deformation increases the bulk density of the semicoke, and, more importantly, orients the highly viscous liquid crystalline material in order to give the resulting flakes anisotropic properties. Since the purpose of the deformation is the alignment of the internal semicoke structure, the semicoke should not be disrupted more than necessary prior to being deformed, for example, by comminuting or grinding into a powder. In addition to possessing an oriented structure after deformation, the semicoke flakes will maintain their orientation throughout subsequent carbonizing and graphitizing. As will be discussed later, it has been found that the degree of orientation within each flake will actually increase in subsequent processing, resulting in excellent anisotropic properties of the carbon flakes and the bodies produced with oriented semicoke flakes. This is accomplished without the additional step of oxidatively thermosetting the as-formed flakes according to the prior art.

The semicoke must not be fully constrained during the plastic deformation step, i.e., it should be allowed to flow laterally in at least one direction, preferably in more than one direction, in response to deformation forces. In practice, as the semicoke is reduced in thickness, it tends to initially density and not change significantly in the cross-sectional area perpendicular to its thickness. As the reduction in thickness continues and the density increases, however, the cross-sectional area perpendicular to the thickness tends to increase as the semicoke flows in directions perpendicular to the thickness. The internal shear forces during this plastic flow cause the carbon layers to become aligned in the direction of flow. The semicoke should therefore not be deformed in an enclosed mold which would inhibit plastic flow.

Proper plastic deformation of the semicoke into flake-like bodies can be accomplished by any number of methods, among them calendering between rolls or squeezing between plates. A combination of calendering and squeezing between plates may be employed, for example, by placing the semicoke between two plates and passing the plates between two calender rolls. As will be further explained, the deformation is carried out at elevated temperature, above the TMA deformation temperature of the semicoke, and in a substantially oxygen-free atmosphere. The method of squeezing the semicoke between plates is preferred because the plates can be heated to the desired temperature more easily than the rolls, thereby avoiding cooling of the semicoke during deformation.

It is preferably that the semicoke remain essentially oxygen free during heating and deformation. Short exposure times to air, however, can be tolerated in the practice of this invention. For example, after exposure of semicoke at 500° C. to air for approximately five seconds, the depth of penetration of oxygen was measured to be less than 100 microns. Excessive reaction with oxygen may cause oxidative thermosetting to occur throughout, thereby making the structure infusible and non-plastically deformable. As a result, there would occur no densification or plastic flow to align the semicoke molecules. For these reasons the semicoke is preferably heated and deformed in a substantially oxygen-free atmosphere. This may be accomplished in the aforementioned example of squeezing semicoke between plates by enveloping the semicoke in a metal foil.

The semicoke must be at temperature above its TMA deformation temperature in order for proper plastic deformation and alignment to occur. Plastic deformation and alignment will be more readily accomplished as the semicoke temperature is increased. However, the time taken for heating and deforming the semicoke is also important. Deformation should be accomplished as quickly as possible because at elevated temperature volatiles are being expelled from the semicoke and further polymerization is taking place. If the semicoke advances to a stage at which it is no longer plastically deformable, alignment will become impossible. The semicoke will fracture rather than plastically flow.

The proper combination of time and temperature to plastically deform the semicoke and align the molecules is determined by simple experimentation. As a guideline, it has been experimentally determined that the TMA deformation temperature of semicoke having a TMA deformation temperature between 400° C. and 450° C. increases at the rate of approximately 0.5° C. per minute when held at 450° C.

The relative reaction rates of semicoke at other temperatures based on the at 450° C. can be determined from the Arrehnius equation:

$$K_t = Ae^{-\Delta E/RT}$$

where:
$k_t$ = specific reaction rate constant at temperature T
A = constant for the semicoke
E = activation energy for the polymerization process, 45 kcal/mole based on published data
R = universal gas constant
T = reaction temperature (°K.)

A calculation of the increase of semicoke TMA deformation temperature when the semicoke is held for one minute at higher temperatures is given below:

| Semicoke Temperature | TMA Deformation Temperature Change |
|---|---|
| 500° C. | +4° C. |
| 520° C. | +8° C. |
| 550° C. | +22° C. |

To assure that the semicoke is sufficiently plastically deformable, the semicoke temperature should be above the TMA deformation temperature and is preferably at least 40° C., and more preferably, from 40° C. to 80° C., above the TMA deformation temperature. In this temperature range, semicoke has been found to be readily plastically deformable and remain so for a reasonable period of time. Because the semicoke advances more rapidly at higher temperature, it is preferred that the temperature of deformation not exceed 550° C. The semicoke should still be plastically deformable immediately after it has been deformed to align the molecules.

The extent to which the semicoke is reduced in thickness is important in achieving the degree of anisotropy desired in the finished flake-like shapes. Deformation accomplishes a reduction in thickness by densification and lateral plastic flow of the semicoke in response to compression forces. As stated above, it is the shear force developed during plastic flow that causes the internal structure to become aligned. In general, the greater the reduction, the greater is the degree of orientation in the molecular structure that results. Semicoke can be deformed in the form of small individual pellets or a single larger lump or mass. The degree of reduction is measured by the compression ratio, i.e., the ratio of thickness before pressing to thickness after pressing. For semicoke having the preferred minimum bulk density of about 0.3 Mg/m$^3$, the compression ratio should preferably be greater than 3:1 and more preferably greater than 5:1. Reductions less than this will generally not provide enough plastic flow to align the molecular structure. The resulting bulk density will be at least about 0.9—1.0 Mg/m$^3$, and could be as high as 1.3 Mg/m$^3$ since most of the large holes will be eliminated during the pressing operation.

Also important to the final degree of orientation of the deformed semicoke are the viscosity and the deformation rate. Since all the orienting phenomena in a liquid or plastic crystal are flow-orientation phenomena, one can vary and control the molecular orientation in the resulting semicoke flakes by modifying the semicoke and the deformation process parameters. A lower semicoke viscosity and a lower deformation rate will tend to produce better carbon layer alignment.

The final semicoke flake thickness will be determined by the starting semicoke thickness and by the degree of reduction. Because the orientation of the structure of the semicoke flakes will not be destroyed in subsequent heat treatments, it now becomes practical to produce carbon and graphite bodies in greater thicknesses and with greater degrees of anisotropy than previously had been possible. This increases the rate at which flakes can be produced.

A significant feature of the present invention is that it successfully separates the polymerization of pitch from the physical deformation process. Unlike processes which mold mesophase pitch directly into a body and polymerized it in its final shape, the present invention allows the pitch-based precursor material to be polymerized to a considerable degree to semicoke without destroying the ability to orient its structure. It is important that the semicoke be advanced sufficiently before plastic deformation so that concurrent or subsequent heat treatment will not cause further foaming and loss of orientation of the structure due to expulsion of large amounts of volatiles. Semicoke having a volatile content less than 10 weight percent and a TMA deformation temperature of at least 400° C. has been found to meet this criterion. Once pitch is advanced to semicoke, it can be heated rapidly to above the TMA deformation temperature, plastically deformed to the desired shape and thickness, and then carbonized with less danger of disrupting its shape and internal orientation. However, if the semicoke is too far advanced toward infusible coke, as for instance those semicokes having a TMA deformation temperature well in excess of 500° C., then plastic deformation and orientation of the internal semicoke structure will not be possible. Therefore, the semicoke TMA deformation temperature is preferably from 400° to 500° C., and more preferably from 440 to 470° C. Thickness of 0.3 mm to 1 mm and even greater are possible because there is no need to allow for the escape of large amounts of volatiles.

After the semicoke is deformed to produce flake-like bodies, it can be carbonized, i.e., heat treated in a non-oxidizing atmosphere to increase carbon content. As used herein, "carbonization" refers to any heat treatment which increases the carbon value of semicoke, including coking or calcining. The as-pressed semicoke is essentially oxygen-free and can be coked and calcined by conventional techniques. Coking is preferably completed in a nitrogen-filled chamber by heating at a rate of 0.4° C.min to 550° C. Calcining is preferably carried out in a graphite capsule in a carbon tube furnace by heating to 1450° C. in a period of between one and three hours and maintaining temperature at 1450° C. for at least two hours.

The semicoke flakes undergo a gradual improvement in structural orientation and order during the coking and calcining steps. During the calcining step, delamination of the flakes into thinner flakes has been observed. The high degree of structural orientation of the calcined semicoke flakes is apparent from this behavior. The delamination process produces thinner flakes with a higher aspect ratio, i.e., a higher ratio of length in layer plane directions versus thickness perpendicular to the plane. The calcined semicoke flakes posses high hardness and strength to the extent that they are difficult to mill in conventional particle size reduction systems.

It is well recognized that carbons are composed of carbon atoms in two-dimensional layers. Carbonized semicoke flakes produced according to the present invention will tend to have internal carbon layers parallel to the plane of the flake. As used herein "plane of the flake" refers to a plane parallel to the local formed surface of the flake or sheet. This orientation is in contrast to spun carbon fibers which have planes generally parallel only to a single axis, namely, that of the fiber. While perfect carbon layer parallelism has not been experimentally observed in any article of this invention, observations by polarized light microscopy and X-ray diffraction have shown that the degree of parallelism of the carbon layers varies only slightly from the plane of the flake. This orientational anisotropy within the plane of the flake can be modified by controlling the degree of reduction of thickness, the extensional flow, and shear directions during the forming process. A measurement of the degree of preferred orientation by X-ray diffraction indicated that the full-width-at-half-maximum (FWHM) of the orientation distribution of layer normals is no greater than 65° and averages approximately 60° throughout the as-pressed semicoke flakes. This degree of orientation is considered in the art to evidence a high degree of anisotropy.

The determination of orientation by this method is made by plotting the distribution of molecule layer normals within a given flake body, i.e., the fraction of molecules having normals at a given angle with respect to the normal to the plane of the flake. It has been found that in anisotropic pitch-based carbonaceous material, from the mesophase pitch stage through graphite, this distribution is normal, or Gaussian. The maximum of the distribution curve is found perpendicular to the direction of material flow during forming, which direction, in the case of pressed flakes, is parallel to the plane of the flake. The width of the Gaussian distribution curve at one-half the maximum height of the curve is the full-width-at-half-maximum, or FWHM, and is defined here as the degree of preferred orientation. Perfect anisotropy will have a 0° FWHM (meaning that all molecule layers are perfectly parallel to the plane of the flake, and the distribution curve has a width of zero) while lesser degrees of anisotropy will have increasing FWHM readings (as the number of molecule layers having different and greater angles, with respect to the plane of the flake, increases).

In practice, the distribution of molecule layer normals is measured by X-ray diffraction techniques. The X-ray source and detector are set to produce an incident and diffracted beam of approximately 13° (the Bragg angle corresponding to graphite interlayer diffraction) with respect to the plane of the flake in its initial position. X-ray intensity is measured as the flake sample is rotated about an axis perpendicular to both the incident beam and the normal to the plane of the flake, giving a plot of diffracted intensity versus angle with respect to initial sample position. The X-ray diffracted intensity is proportional to the number of molecular layers whose normals are parallel to the line bisecting the included angle between the incident beam and the detected beam. The FWHM of the distribution of layer normals is determined from this plot.

In FIG. 1 there is shown the plot of a distribution of layer normals $n(\theta)$ within an anisotropic semicoke body having a full-width-at-half-maximum (FWHM) of 60°. A denotes the maximum of the distribution at 0°. A/2 denotes the distribution half maximum at ±30°.

Figure 2:
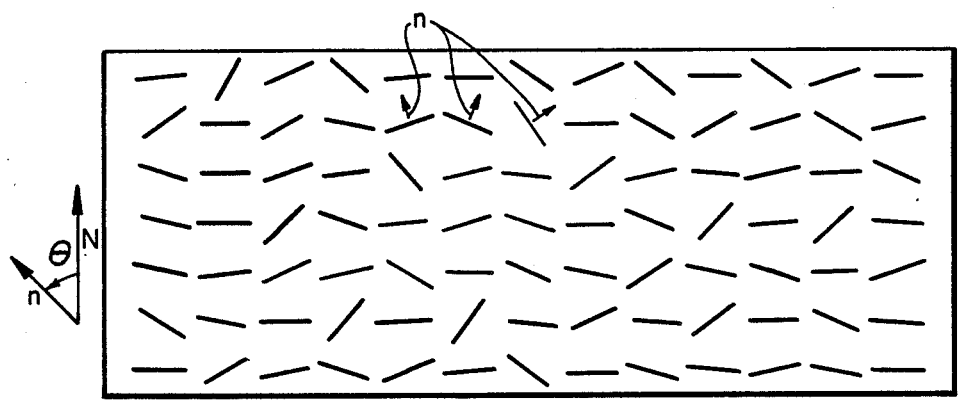
FIG. 2 is a pictorial representation of the molecular layers within a semicoke body having the orientation distribution of FIG. 1.

In FIG. 2 there is shown a pictorial representation of the molecular layers within a semicoke flake having the orientation distribution shown in FIG. 1. The normal to the plane of the flake, N, is shown. For simplicity of illustration, it is assumed that all of the molecular normals, n, lie in the plane of the page. The angle $\theta$ designates the angle between the molecular normals, n, and the normal to the plane of the flake, N. Orientation distributions having a FWHM less than 60° indicate a better alignment while those having a FWHM greater than 60° indicate a poorer alignment.

The carbonized flakes can be graphitized by heating to normal graphitizing temperatures (generally in excess of 2800°) by themselves or after combination in a binder/filler mixture. In either case, the semicoke flakes undergo a gradual improvement in orientation with respect to the plane of the flake during the carbonization and graphitizing processes. It has been observed that the degree of orientation, as characterized by the FWHM obtained by X-ray, improved from no greater than 65° as-pressed, to no greater than 50° after carbonizing at approximately 1000° C., and to no greater than 40° after graphitizing at approximately 3000° C.

The anisotropic flakes of this invention, in their semicoke, coke, calcined or graphite form, can be conventionally combined with a carbonaceous pitch binder to form various carbon or graphite shapes. The degree of orientation of the flakes within the finished shape will determine the directional properties of the finished shapes.

These anisotropic flakes may be crushed or sized to facilitate mixing with the binder, or used as is. The mixture may commonly contain from 70 to 80 weight percent anisotropic flakes, the remainder being binder. After a homogeneous mixture has been obtained, the mixture is extruded to the desired shape. Extrusion of the mixture is generally performed at a temperature of approximately 110° C. and pressure between approximately 0.7 and 1.4 MPa. The extrusion process orients the flakes in the mixture in the direction of extrusion.

Carbonization of the shaped article may be effected by heating the article in a substantially non-reactive atmosphere such as nitrogen or argon to a temperature sufficiently elevated to expel volatiles and advance the binder to a relatively pure carbon. Temperature in excess of 800° C., preferably above 1000° C. is required for carbonization of the flake/binder mixture. The rate of heating and time needed at temperature are functions of the thickness and mass of the article and may be readily determined by simple experimentation. The heating rate should be sufficiently slow to avoid excessive porosity due to expelled volatiles. The time at temperature is generally from 1 to 2 hours. A graphitized body may be obtained by further heating to at least 2800° C. for at least 1 hour.

If excessive porosity is present in the finished article, it may be impregnated with pitch and subjected again to carbonizing and graphitizing heat treatments.

Graphitized shapes produced in this manner using the anisotropic flakes of the present invention have been found to have longitudinal coefficients of thermal expansion less than $0.1 \times 10^{-6}$ °C.$^{-1}$ (average between 30 and 100° C.)

In addition to their use as filler material, the carbon and graphite flakes of the present invention can be used by themselves as finished or semi-finished product.

The following non-limiting examples are set forth for purposes of illustration.

EXAMPLE 1

Anisotropic semicoke flakes were produced from a laboratory-prepared mesophase pitch. A 70 percent mesophase pitch was prepared from 120° C. softening point petroleum pitch in a heated reaction vessel by well-known techniques. The softening temperature of the mesophase pitch produced was 325–327° C. The mesophase pitch was thereafter advanced to a semicoke by heating in a covered pan in a nitrogen atmosphere to 450° C. and holding at that temperature for six hours. The TMA deformation temperature of the semicoke was 454° C. and its volatile content was 9 percent.

The next step after producing the semicoke was plastically deforming it into flakes. Random shaped lumps of semicoke, approximately 5–10 mm in diameter, were placed in a single layer in an approximately flat pouch of 0.05 mm thick tool steel. The pouch was crimped shut to prevent oxidation in subsequent heating and then placed between two 1.5 mm thick steel plates. The semicoke pouch-plate assembly was heated in nitrogen in a radiant furnace to 500° C. in approximately 45 minutes, and pushed from the furnace into the nips of a set of steel calender rolls within 5 seconds to squeeze the steel plates together. After squeezing, each semicoke lump took the shape of a flake, the thickness of each being approximately 1 mm. When the starting lumps were touching or close together, the final compressed semicoke has the appearance of much larger flakes or sheets. The thickness reduction after deformation, expressed as a compression ratio, was between approximately 5:1 and 10:1. A measurement of the TMA deformation temperature of one of the flakes showed it to be essentially unchanged immediately after deformation.

The orientation of the layer planes within the flakes was observed by polarized light microscopy and X-ray diffraction. The FWHM of the distribution of layer normals within the flakes ranged from 55° to 64° with respect to the plane of the flake.

The semicoke flakes were coked by heating in a nitrogen-filled chamber at a heating rate of 0.4° C./min to 558° C. Calcining was carried out in a graphite capsule in a tube furnace with the following heating schedule: fast to 1450° C. over a 1.3 hour period, followed by a two hold at 1450° C.

Some of the calcined flakes were graphitized by heating in a non-oxidizing atmosphere to approximately 3000° C. The FWHM of the distribution of layer normals of these flakes decreased to 23–37° relative to the normal to the plane of the flake.

A summary of the evolution of layer orientation with heat treatment of the semicoke flakes is given in Table I.

TABLE I

| Stage of Semicoke Flakes | X-ray Orientation(FWHM) |
|---|---|
| as-pressed | 55–64° |
| coked (558° C.) | 48–50° |
| calcined (1450° C.) | 41–48° |
| graphitized (3000° C.) | 23–37° |

EXAMPLE 2

The strength of the calcined anisotropic semicoke flakes of Example 1 was measured by comparing their grindability to that of conventional calcined petroleum coke which had not been pressed and oriented in the semicoke state. The following method was employed:

A one gram sample of crushed calcined anisotropic semicoke flakes produced by the process of Example 1 was sized to a 10/20 Tyler mesh particle size by sieving and placed in a small plastic vial of 11 cm$^3$ volume. The vial containing the calcined anisotropic flake and plastic ball (1 cm diameter) was then shaken in a Spex Industries, Inc., Model 8000 Mixer/Mill apparatus for five minutes. Simultaneously, a similar vial containing one gram of 10/20 Tyler mesh conventional calcined petroleum based coke (calcined under the same conditions as the flakes) was placed alongside of it and shaken.

The resulting materials were sieved through a stack of sieves of 35, 65, and 100 Tyler mesh sizes. The starting materials which were 10/20 mesh were 100% on 35 mesh. The percentages of milled samples on and through the various sieve sizes are shown in Table II.

TABLE II

| | Percentages of Milled Sample of Various Particle Sizes | | | |
|---|---|---|---|---|
| Starting 10/20 Mesh | On 35 Mesh | 35/65 Mesh | 65/100 Mesh | Through 100 Mesh |
| Conventional Calcined Petroleum Coke | 0.7% | 11.9% | 17.6% | 69.7% |
| Calcined Anisotropic Semicoke | 19.0% | 35.5% | 15.9% | 29.6% |

TABLE II-continued

| Starting 10/20 Mesh | Percentages of Milled Sample of Various Particle Sizes | | | |
|---|---|---|---|---|
| | On 35 Mesh | 35/65 Mesh | 65/100 Mesh | Through 100 Mesh |
| Flakes | | | | |

From Table II it can be seen that the attrition of the calcined semicoke flakes is much less than that of ordinary calcined petroleum coke. For example, after milling, practically none (0.7%) of the on-35 mesh particles of calcined petroleum coke have survived. On the other hand, 19% of the on-35 mesh calcined anisotropic semicoke flakes have survived. Furthermore, much more of the conventional calcined petroleum coke has been reduced to a fine powder (through 100 mesh) than has the calcined anisotropic semicoke flakes. The higher strength of the calcined anisotropic pressed semicoke is apparent from this data.

EXAMPLE 3

Carbonized anisotropic semicoke flakes produced according to the process of Example 1 were incorporated into a ¾ inch graphite rod by first mixing crushed flakes with a pitch binder (binder level 30 pph), extruding the rod shape at a temperature of 110° C. and employing an extrusion pressure of between 0.7 and 1.4 MPa., and then carbonizing and graphitizing the rod at 1000° C. and 3000° C., respectively. The rod was then tested for coefficient of thermal expansion (CTE), density, and electrical resistivity.

Two different size distributions of carbonized anisotropic flakes were used. Mix no. 1 was made with 55% 10/20 Tyler mesh crushed carbonized anisotropic semicoke flakes and 45% conventional carbonized petroleum coke flour (flour size 100% through 35 Tyler mesh and 55% through 200 Tyler mesh). Mix no. 2 was made with 45% 10/20 mesh 20/35 mesh crushed carbonized anisotropic semicoke flakes, and 10% conventional carbonized petroleum coke flour.

Rods incorporating conventional carbonized petroleum coke particles were made as control specimens. Mix no. 3 was made with 55% 10/20 Tyler mesh conventional carbonized petroleum coke particles and 45% conventional carbonized petroleum coke flour. Mix no. 4 was made with 45% 10/20 mesh conventional carbonized petroleum coke particles, 45% 20/35 mesh conventional carbonized petroleum coke particles, and 10% conventional carbonized petroleum coke flour. Mixes 1 through 4 were mixed with the same pitch binder level and extruded and heat treated under the same conditions.

CTE measurements were made along the axis of the extruded graphite rods by Lamb's roller technique, well known in the art. This method measures the difference in thermal expansion between two dissimilar materials. The test specimen is mounted in a frame parallel to a bar, known as the "unispan" bar, made of a different material. The test specimen and unispan bar are firmly fixed to each other and the frame at one end, the other end of each being free. A rod attached to a mirror is placed between the test specimen and unispan bar near their free ends, in contact with each. A reticle and scale are mounted at a fixed distance from the expansion unit and are able to measure rotation of the mirror in response to the differential expansion of the unispan bar and the test specimen.

A precisely calibrated lampblack-based standard rod is mounted in place of the test specimen. The entire frame-unispan bar-lampblack rod assembly is heated through the temperature range from 30° C. to 100° C. As the assembly is heated through this range, the rod and mirror rotate due to the differential expansion of the unispan bar and lampblack rod. The difference in degree of rotation between 30° C. and 100° C. is measured, and from this the coefficient of thermal expansion of the bar is determined. The process is repeated with the test specimen in place of the lampblack rod and with the unispan bar serving as the standard. The coefficient of thermal expansion of the test specimen is then determined by comparison with the unispan bar.

The results of the tests are shown in Table III.

TABLE III

| | Properties of Extruded Graphite Rods Incorporating Carbonized Semicoke Flake and Conventional Petroleum Coke Filler | | |
|---|---|---|---|
| Mix Used in Rod | CTE (Lamb) ($\times 10^{-6}$ °C.$^{-1}$) | Bulk Density (Mg/m$^3$) | Electrical Resistivity (microhm · m) |
| Mix 1 | 0.07 | 1.48 | 11.8 |
| Mix 2 | 0.00 | 1.43 | 15.9 |
| Mix 3 | 0.56 | 1.56 | 8.4 |
| Mix 4 | 0.55 | 1.45 | 11.2 |

The coefficients of thermal expansion obtained for the various mixes show the superiority of the anisotropic semicoke flakes of the present invention. Rod mixes 1 and 2 which incorporated oriented anisotropic semicoke flakes have significantly lower CTE's than rod mixes 3 and 4 which incorporated conventional coke particles. Rod mix 2, which incorporated more semicoke flakes than mix 1, also had a lower CTE.

EXAMPLE 4

Anisotropic semicoke flakes were produced from three different commercial-type delayed coker raw coke samples which had been discarded as having too high a volatile content. The characteristics of these cokes were as shown in Table IV:

TABLE IV

| | Properties of Delayed Coker Samples | | |
|---|---|---|---|
| | Sample A | Sample B | Sample C |
| Bulk Density | 0.49 Mg/m$^3$ | 0.39 Mg/m$^3$ | 0.88 Mg/m$^3$ |
| TMA Deformation Temperature | 443° C. | 445° C. | 386° C. |
| Volatile content | 9.5% | 8.7% | 8.5% |

Pieces of each of the delayed coker samples approximately 7.5 mm thick and between 13 and 26 mm wide were placed between two flat mold surfaces in an electrically heated press. A slow flow of nitrogen was passed around the samples. The press heater was turned on and the samples were brought from room temperature to 470° C. at a programmed heating rate of approximately 11° C. per minute. The programmer was then turned off and the sample temperature was raised to a final temperature of 500° C. in approximately five more minutes. A force of approximately 2270 kg. was then applied to squeeze the semicoke. The heating was discontinued at that time and, after the samples cooled to 475° C., the pressure was released. The resulting flake-like bodies were removed from the mold after cooling to room temperature. The properties were determined to be as follows:

TABLE V
Properties of Semicoke Flakes

| | Sample A | Sample B | Sample C |
|---|---|---|---|
| Compression Ratio | 11:1 | 8:1 | 7:1 |
| Flake Thickness | 0.66 mm | 0.9 mm | 1.1 mm |
| Bulk Density | 1.14 Mg/m$^3$ | 1.06 Mg/m$^3$ | 0.42 Mg/m$^3$ |
| Average X-ray Orientation (FWHM) Throughout the Flake | 53° | 53° | * |

*no accurate measurement because of foaming

While samples A and B, each having TMA deformation temperatures above 400° C., exhibited a high density and a uniformly high degree of layer normal alignment throughout the body, sample C, having a TMA deformation temperature below 400° C., did not, thereby demonstrating the importance of this lower limit on TMA deformation temperature in the process of this invention. Sample C foamed excessively during heat treatment because of the evolution of volatiles from within. This result is apparent from the low density of sample C after deformation and heating. Not only are the molecules in samples A and B relatively dense and highly aligned, as shown by the 53° FWHM of the distribution of layer normals, but the bulk density and alignment is comparable to that of the laboratory-produced pitch-based semicoke of Example 1.

EXAMPLE 5

A flake-like semicoke body was produced from the high volatile content delayed coker raw coke used as Sample B describe in Example 4. The properties of the starting coke were as follows:

| | |
|---|---|
| TMA Temperature | 445° C. |
| Volatile content | 8.7% |
| Thickness | 15 mm |

The sample was heated and pressed in the same manner as described in the previous Example, except that the sample was heated at 11° C. per minute to 490° C. and then heated at a slower rate to 525° C., at which temperature it was plastically deformed between plates under 900 kg. force. The pressure was then released and the sample cooled in the press to room temperature. The as-formed sample had a thickness of 1.4 mm; the compression ratio was approximately 11:1. No bulk density measurement was made, but there was no visible foaming or porosity in the as-formed sample. X-ray measurement revealed a FWHM distribution of layer normals of 49°.

EXAMPLE 6

Approximately 2 kg of highly anisotropic flake-like semicoke was produced from a delayed coker semicoke having a volatile content of 8.7% and a TMA deformation temperature of 445° C. The starting semicoke was in the form of random shaped lumps with diameter between 6 and 12 mm. The semicoke was heated and calendared in a pouch-plate assembly as described in Example 1. The semicoke pouch-plate assembly was heated in a nitrogen atmosphere over a 45 minute period to 400° C., and then further heated to 500° C. over a 7 to 12 minute period. The semicoke pouch-plate assembly was then pushed from the furnace directly into the nips of the calendar rolls.

The final thickness of the calendared flakes was from 0.5 to 1.2 mm, indicating a compression ratio between 5 and 10 to 1. X-ray measurement determined that the FWHM of the layer orientations within the flakes ranged from 48° to 56° with respect to the plane of the flake. Optical microscopy indicated the essential absence of porosity and a high degree of preferred orientation in the flakes.

The TMA deformation temperature of the calendared flakes was remeasured and found to have increased by approximately 60° C. over the starting semicoke. This TMA deformation temperature increase contrasted with that of Example 1 which showed essentially no change. It is hypothesized that the large increase in TMA deformation temperature was due to the longer residence time of the semicoke between 480° and 500° C. or slight oxidation during cool-down after calendaring. Despite the increase, the semicoke was sufficiently plastically deformable at 500° C. and yielded a highly anisotropic flake material.

The successful production of a highly oriented semicoke from commercial delayed coker raw coke as described in the three previous examples demonstrates that a heretofore considered waste material can be reutilized as a valuable raw material. It is only necessary that the commercially produced semicoke be plastically deformable and have a suitable TMA deformation temperature.

While there have been shown and described what are considered to be the preferred embodiments of the present invention, it will be obvious to those of ordinary skill in the art that various changes and modifications may be made therein without departing from the spirit and scope of the invention as defined by the claims that follow.

Having thus described the invention, what is claimed is:

1. A process for producing an anisotropic carbonaceous body comprising the steps of:
   (a) providing a carbonaceous pitch-based semicoke having a volatile content less than 10 weight percent and a TMA deformation temperature of at least 400° C.; and
   (b) plastically deforming said semicoke at temperature above said TMA deformation temperature to align the internal semicoke structure and form an anisotropic flake-like semicoke body.

2. The process of claim 1 wherein said semicoke is produced by heating a carbonaceous pitch while excluding oxygen and retaining volatile pitch constituents and reaction products over the pitch.

3. The process of claim 1 wherein said deforming of the semicoke is in a substantially oxygen-free atmosphere.

4. The process of claim 1 wherein said semicoke has a bulk density of at least 0.3 Mg/m$^3$ before deformation.

5. The process of claim 4 wherein the deforming reduces the thickness of the semicoke by a compression ratio of greater than 3:1.

6. The process of claim 4 wherein the deforming reduces the thickness of the semicoke by a compression ratio of greater than 5:1.

7. The process of claim 1 wherein the deforming temperature is at least 40° C. above said semicoke TMA deformation temperature.

8. The process of claim 1 wherein the deforming temperature is no greater than 550° C.

9. The process of claim 1 wherein said semicoke TMA deformation temperature is from 400° C. to 500° C.

10. The process of claim 1 wherein said semicoke TMA deformation temperature is from 440° C. to 470° C.

11. The process of claim 1 wherein the deforming is by squeezing between plates.

12. The process of claim 1 wherein the deforming is by calendering.

13. The process of claim 1 wherein the bulk density of said flake-like semicoke body is at least 0.9 Mg/m$^3$.

14. The process of claim 1 wherein said flake-like semicoke body has a FWHM of the orientation distribution of layer normals no greater than 65°.

15. The process of claim 1 including the additional step of carbonizing the flake-like semicoke body.

16. The process of claim 15 including the additional step of graphitizing the carbonized flake-like semicoke body.

17. A process for producing an anisotropic carbonaceous body comprising the steps of:
 (a) heating a carbonaceous pitch while excluding oxygen and retaining volatile pitch constituents and reaction products over the pitch to form a semicoke having a volatile content less than 10 weight percent, a TMA deformation temperature of at least 400° C., and a bulk density of at least 0.3 Mg/m$^3$; and
 (b) plastically deforming said semicoke by a compression ratio of greater than 5:1 at temperature at least 40° C. above said TMA deformation temperature and in a substantially oxygen-free atmosphere to form a flake-like semicoke body having a FWHM of the orientation distribution of layer normals no greater than 65°.

18. The process of claim 17 wherein said semicoke TMA deformation temperature is from 400° C. to 500° C.

19. The process of claim 17 wherein said semicoke TMA deformation temperature is from 440° C. to 470° C.

20. The process of claim 17 wherein the deforming temperature is no greater than 550° C.

21. The process of claim 17 wherein the deforming is by squeezing between plates.

22. The process of claim 17 wherein the deforming is by calendering.

23. The process of claim 17 including the additional step of carbonizing the flake-like semicoke body.

24. The process of claim 23 including the additional step of graphitizing the carbonized flake-like semicoke body.

25. A process for producing a low coefficient of thermal expansion graphite body comprising (a) plastically deforming a semicoke having a volatile content less than 10 weight percent, a bulk density of at least 0.3 Mg/m$^3$ and a TMA deformation temperature of at least 400° C., at a temperature above said TMA deformation temperature to form flake-like semicoke bodies; (b) calcining said semicoke bodies; (c) mixing said flake-like semicoke bodies with a carbonaceous pitch binder to provide a mixture; (d) extruding the mixture into a desired shape; and (e) carbonizing and thereafter graphitizing the extruded shape.

26. An anisotropic, flake-like plastically deformable semicoke body, said semicoke body having a volatile content less than 10 weight percent and a TMA deformation temperature of at least 400° C., and further having crystallite layers oriented essentially parallel to the plane of the flake throughout said body, characterized by the FWHM of the orientation distribution of layer normals being no greater than 65°.

27. The semicoke body of claim 26, wherein the thickness of said body is at least 1 mm.

28. The semicoke body of claim 26 wherein said semicoke has a TMA deformation temperature of from 400° C. to 500° C.

29. The semicoke body of claim 26 wherein said semicoke has a TMA deformation temperature of form 440° C. to 470° C.

30. The semicoke body of claim 26 wherein the volatile content is between about 8 and about 10 weight percent.

31. The semicoke body of claim 26 wherein the thickness to width ratio less than about 1:5.

32. The process of claim 1 wherein the volatile content of the semicoke in step (a) is between about 8 and about 10 weight percent.

33. The process of claim 17 wherein the volatile content of the semicoke formed in step (a) is between about 8 and about 10 weight percent.

* * * * *

UNITED STATES PATENT AND TRADEMARK OFFICE
CERTIFICATE OF CORRECTION

PATENT NO. : 4,891,203

DATED : Jan. 2, 1990

INVENTOR(S) : Leonard S. Singer, David T. Orient

It is certified that error appears in the above-identified patent and that said Letters Patent is hereby corrected as shown below: TITLE PAGE:

Inventor's name is Leonard S. Singer, not Sidney L. Singer.

Column 1, line 16, after the word "flexural", insert --and tensile strength, thermal conductivity,--.

Column 1, line 34, delete period (.) after "other".

Column 1, line 38, delete "anistropic" and substitute therefor. --anisotropic--.

Column 2, line 3, delete "givers" and substitute therefor --fibers--.

Column 3, line 46, insert comma (,) after Inc.".

Column 5, line 4, delete period (.) after "vessel".

Column 5, line 24, delete "400°" and substitute therefor --440°--.

Column 7, line 5, delete "preferably" and substitute therefor --preferable--.

Column 9, line 22, delete "C.min" and substitute therefor --C./min--.

Column 10, line 35, delete "a" and substitute therefor --the--.

Column 13, line 39, after the first occurrence of "mesh", insert --crushed carbonized anisotropic semicoke flakes, 45%--.

UNITED STATES PATENT AND TRADEMARK OFFICE
CERTIFICATE OF CORRECTION

PATENT NO. : 4,891,203

DATED : Jan. 2, 1990

INVENTOR(S) : Leonard S. Singer, David T. Orient

It is certified that error appears in the above-identified patent and that said Letters Patent is hereby corrected as shown below:

Column 15, line 33, delete "describe" and substitute therefor --described--.

Column 18, line 34, delete "form" and substitute therefor --from--.

Signed and Sealed this

Thirteenth Day of August, 1991

Attest:

HARRY F. MANBECK, JR.

*Attesting Officer*  *Commissioner of Patents and Trademarks*